May 10, 1927.
C. E. COCHRAN
1,628,390
ELEVATING PLATFORM TRUCK
Filed Sept. 20, 1924    3 Sheets-Sheet 1
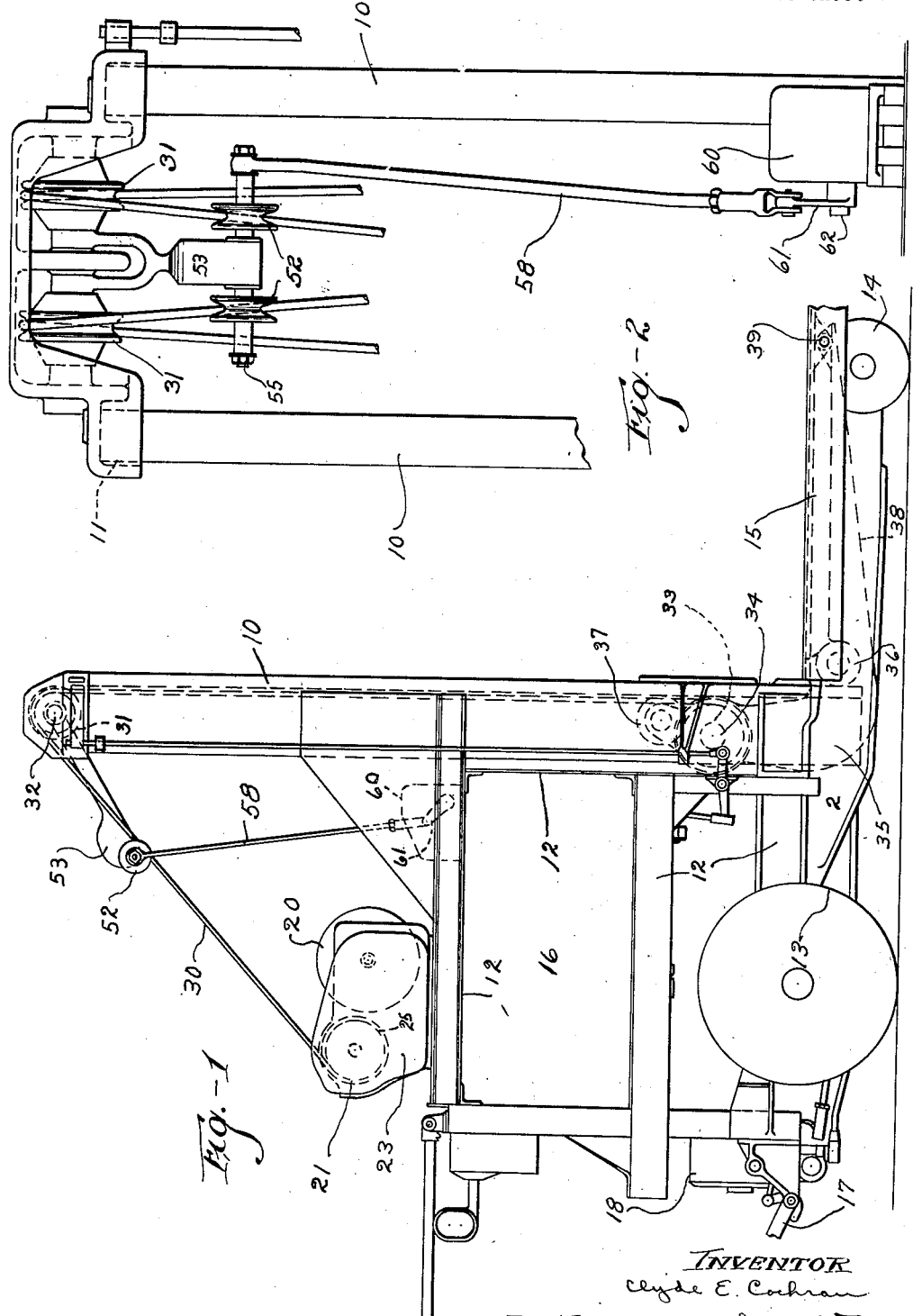
INVENTOR
Clyde E. Cochran
BY Bates, Macklin, Goldruck & Teare
ATTYS.

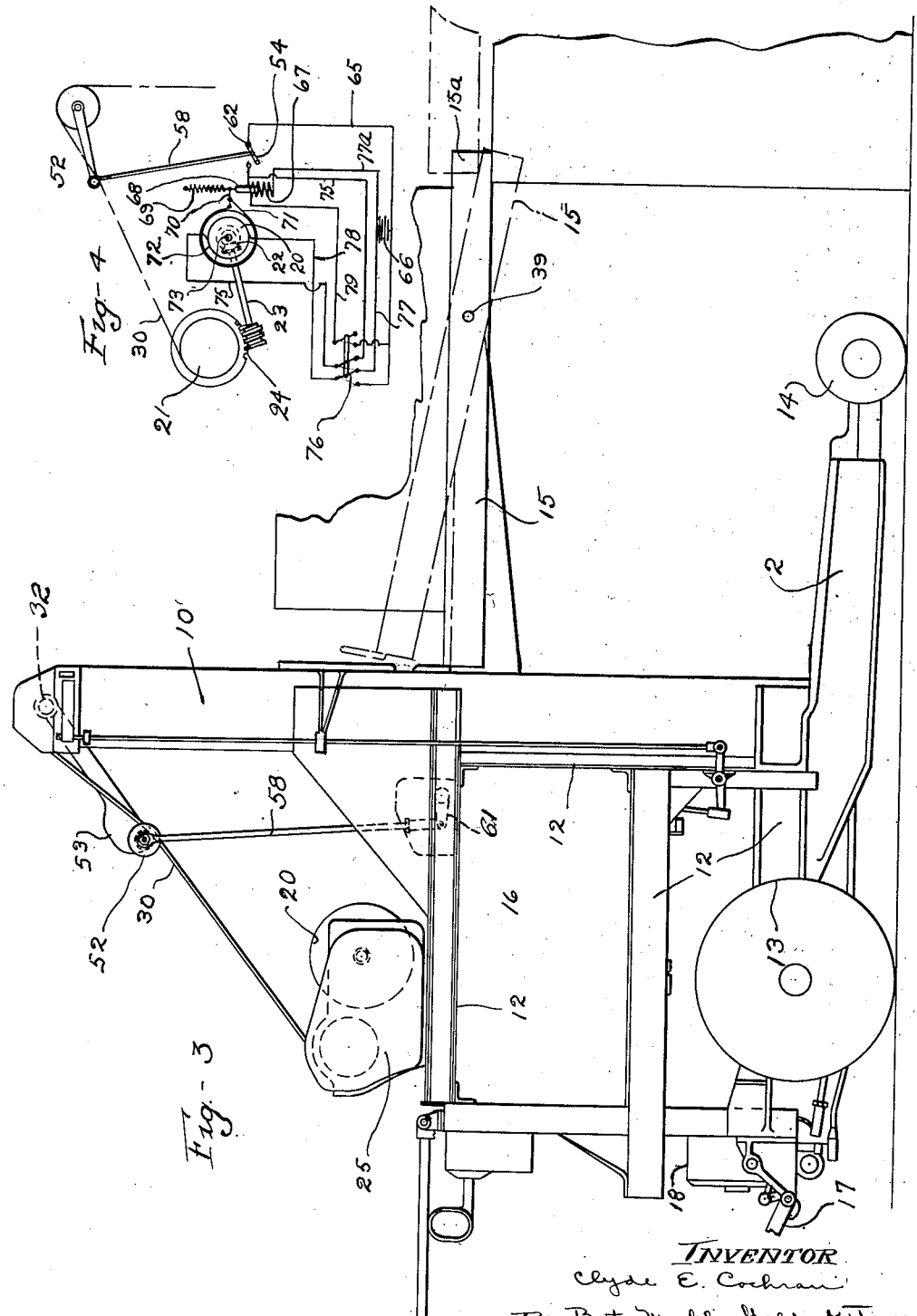

May 10, 1927. 1,628,390
C. E. COCHRAN
ELEVATING PLATFORM TRUCK
Filed Sept. 20, 1924   3 Sheets-Sheet 3
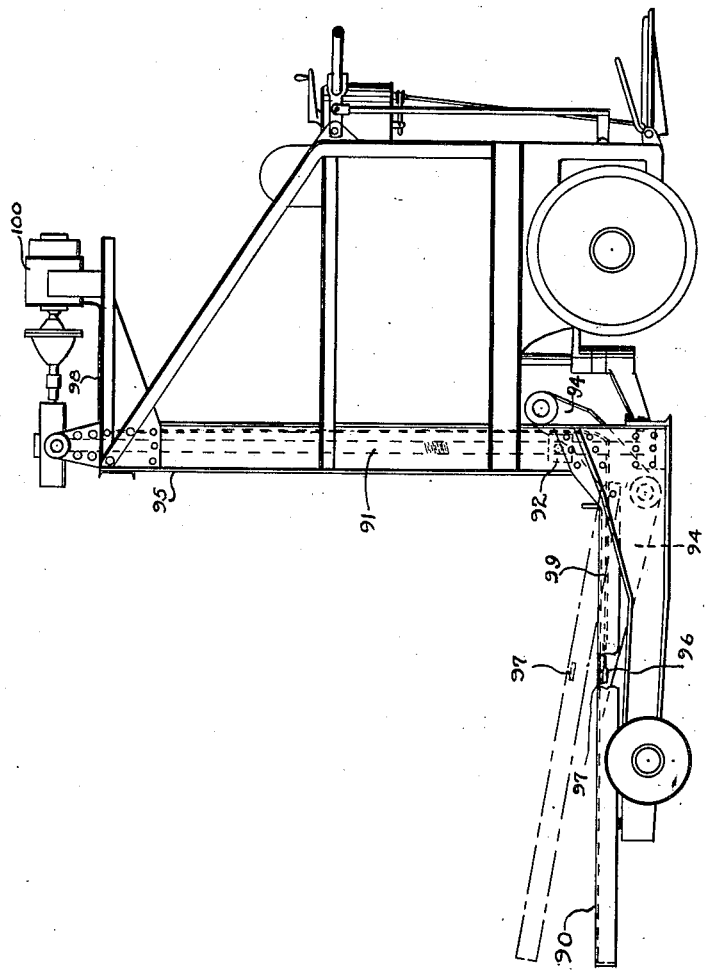

Patented May 10, 1927.

1,628,390

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

ELEVATING PLATFORM TRUCK.

Application filed September 20, 1924. Serial No. 738,840.

This invention is concerned with elevators of the type which embody an elevating platform for raising and lowering a load and the general object is the provision of an automatic control for arresting the power actuation of the load carrying platform in the event the lowering movement of the platform is interrupted in any unusual manner. My invention is herein disclosed as being adapted for use on an industrial truck.

Industrial trucks of general utility usually embody a drop platform which is raised and lowered by a motor under the control of the operator of the truck. The operator's position is generally at the rear end of the truck where visibility of the entire load carrying platform is frequently obstructed, particularly when the platform is loaded. If an obstruction is encountered when raising a load, the operator is given sufficient warning by a tilting movement of the truck, but when lowering the load there is considerable danger of the load and platform being suddenly dropped if the platform were to be inadvertently lowered upon an obstruction. This occurs frequently in the use of industrial trucks of the so called tier lift type where the elevating platform is mounted upon an upright frame and is usually actuated by a winding mechanism and cable. In the event the platform engages an obstruction in its downward movement there is danger of the platform being suddenly released from the obstruction by a backward movement of the truck, thereby permitting the platform and load to suddenly drop, with consequent damage to the truck.

A more specific object of my invention therefore, is the provision of a control mechanism for the platform actuating mechanism of an industrial truck in the nature of an automatically operated switch controlling the actuating motor and which is adapted to disconnect the motor from the source of power in the event any slack or lag occurs in the platform actuating mechanism due to the downward movement of the platform being interfered with by coming in contact with an obstruction.

Other objects of my invention will hereinafter be set forth in the following description referring to the accompanying drawings illustrating an adaptation thereof to industrial trucks of the tier lift type. The essential characteristics are summarized in the claims.

In the drawings, Fig. 1 is a side elevation of a tier lift truck such as is described and claimed in my application Serial No. 614,720 filed January 25, 1923; Fig. 2 is a fragmentary front elevation of a switch control mechanism which is responsive to a taut or slack condition of the hoisting cable; Fig. 3 is a side elevation of the tier lift truck showing the load carrying mechanism at an elevated position; Fig. 4 is a diagrammatic representation of the electrical connections controlling platform actuating motor; and Fig. 5 is a side elevation of a truck embodying a modified form of my invention.

My invention contemplates the provision of a switch mechanism controlling the current from the battery of an industrial truck to the motor actuating the load elevating platform of the truck and in one of the present forms includes an operating mechanism therefor, responsive to the taut or slack condition of an elevating cable actuated by a winding mechanism driven by the motor, the cable being connected to a load elevating platform.

As shown in the drawings my invention is adapted to control the actuating motor of the elevating platform on a tier lift truck. In Fig. 1 such a truck is illustrated as comprising an upright frame formed of braced channel members 10, a sheave supporting frame 11 surmounting the channel members, a truck frame 12 mounted upon drive wheels 13, and small forward wheels 14 and a load elevating platform 15. A motor 18 drives the wheels 13, through suitable reduction gearing (not shown), and is energized by batteries carried within a casing 16 mounted on the rearward portion of the truck. An operator's supporting platform 17 is attached at the rear end of the truck and suitable mechanism (not shown) is provided at this position for controlling the drive motor 18.

Disposed on the frame of the truck, above the battery casing 16 and shown diagrammatically in Fig. 4, is a winding mechanism comprising a motor 20, a winding drum 21, reduction gearing 22 in the form of bevel gears, a transverse shaft 23 and reduction gearing 24 in the form of a worm and gear driving the winding drum 21. This mechanism may be suitably mounted as a unit upon a frame 25 secured to the frame of the truck. The winding drum 21 actuates elevating cables 30 which extend upwardly over the sheaves 31 mounted upon a shaft 32 journaled in the bracket member 11. The lower ends of the cables are attached to a pair of winding drums 33 connected by a differential gearing (not shown) which is mounted upon a shaft 34 carrying pinions engaging racks mounted upon the upright members 10. The shaft 34 is carried by a pair of L-shaped arms 35 carry roller members 36 and 37 engaging opposite sides of the flanges of channel members 10. Rearward extensions 38 of the arms 35 support the elevating platform 15 which is pivotally connected thereto, as shown at 39 in Fig. 1.

The connection 39 may be disposed near the forward end of the load carrying platform whereby the platform rests normally in contact with the extensions 38 of the arms 35 when properly loaded, but when cables 30 are elevating the platform 15 and the rearward end of the platform engages an obstruction as shown by the dot and dash lines in Fig. 3, the platform will begin to tilt thus warning the operator that a continuation of the elevating movement of the platform will cause the load to be displaced therefrom. If however, the load is being lowered and the end 15ª of the platform engages an obstruction, as shown in full lines in Fig. 3, while the cable is being payed out by the winding mechanism, the reaction upon the truck may be such that it may shift slightly and thus permit the platform and load to drop suddenly, thus causing undue shock to the cable members 30 which may fail and permit the load and platform to damage the truck frame.

In the present instance my invention is in the form of a control mechanism responsive in its functioning to the slack or taut condition of the cables 30, and as shown in the drawings, may comprise followers 52 which are mounted upon an arm 53 pivotally suspended at the top of the upright frame on the shaft 32. The followers ride upon the cables 30 and are supported by an axle 55 carried by the arm 53. A switch arm 54 diagrammatically shown in Fig. 4, is connected to the axle 55 by a bar 58, which as shown in Fig. 2, is connected at its opposite end to an arm 61 mounted upon the switch arm shaft 62. The switch may be disposed within a housing 50 which may also serve as a bearing support for the shaft 62.

As shown in Fig. 4, the switch 54 controls the line or circuit 65 extending between batteries 66 and a solenoid winding 67, the winding magnetically actuating a plunger or core 68 which is normally maintained retracted by a spring 69. The spring acts on a brake arm 70 to clamp a brake band 71 against a brake drum 72 mounted on the motor shaft 73 when the circuit leading to the solenoid is open. A pole changing switch 76 is shown in lowering position and current flows from the batteries along the line 77 to the motor by way of the line 78; returns over the line 75 and the switch 54 to a line 65 leading back to the batteries. At the same time, the solenoid is energized from the parallel circuit 77ª and 65. The switch 76 is manually operated to reverse the circuit connections of the motor with the batteries thus reversing the action of the winding drum to raise the platform. In this position of the reversing switch a line 79 is closed to actuate the solenoid. Accordingly assuming that the drum is lowering the platform and it engages an obstruction the switch 54 will be opened by the slackening of the cables 30, power to the motor will be cut off and the brake applied. The arrangement of the switch and circuit is such that the solenoid can always be energized on the positioning of the manual switch to cause the release of the brake so that the motor may drive the winding mechanism in a direction to take in the cable but upon reversal of the motor to pay out the cable the connection is such that the solenoid is maintained energized through the circuit including the switch arm 54 except when the cable becomes slack.

In Fig. 5, I show a more simple form of my invention as applied to a tier lift truck having an actuating means for the load platform 90 comprising a vertical screw 91, which engages a nut 92 mounted upon the platform supporting arms 94. The motor 100 for driving the screw may be mounted at the top of the upright frame 95. The safety switch controlling the motor line may comprise a contact plate 97 rigidly mounted on the arms 94 and an underlying plate 96 mounted on the under side of the platform 90. Lead wires 99 may comprise the line 65 indicated in Fig. 4, whereby relative movement between the platform and arms 94 will arrest the lowering action of the motor 100 upon the screw, it being evident that the operator would have to reverse the motor to raise the platform before the motor can again be driven in a platform lowering direction.

It will be understood that my invention may be embodied in a variety of forms depending upon the particular environment of the adaptation thereof. For example, if it is desired to propel the truck with a gas motor, the device may be adapted to control a clutch connecting the winding mechanism to the power means or it may be adapted to regulate the flow of gas to the engine, either of which would be readily understood by mechanicians skilled in the art.

I claim:—

1. In an industrial truck, the combination of a load-elevating platform, a motor and mechanism driven thereby for lowering and elevating the platform, a battery, a circuit connecting the motor to the battery, an electrically operated brake for the motor, a solenoid connected in said circuit and operating the brake, a switch in said circuit adapted to be opened when a lowering movement of the platform is extraneously interfered with, whereupon the solenoid and motor are deenergized and the brake is caused to arrest movement of the motor, a second circuit connecting the motor and solenoid to the battery, and a manually operated switch controlling both of said circuits, whereby the motor and solenoid may be connected to the battery when the first named switch is open.

2. In an industrial truck, the combination of a load-elevating platform, a motor and mechanism driven thereby for lowering and elevating the platform, a battery, a circuit connecting the motor to the battery, an electrically operated brake for the motor, a solenoid connected in said circuit and operating the brake, a switch in said circuit adapted to be opened when a lowering movement of the platform is extraneously interfered with, whereby the solenoid and motor are deenergized, means associated with said mechanism for operating the switch, a second circuit connecting the motor and solenoid to the battery, and a manually operated switch controlling both of said circuits, whereby the motor and solenoid may be connected to the battery when said means opens the first named switch.

3. In an industrial truck, the combination of a load-elevating platform, a motor and mechanism driven thereby for lowering and elevating the platform, a battery, a circuit connecting the motor to the battery, an electrically operated brake for the motor, a solenoid connected in shunt in said circuit, a switch in said circuit before the shunt connection adapted to be opened when a lowering movement of the platform is extraneously interfered with, whereby both the solenoid and motor are deenergized, a second circuit connecting the motor to the battery and a shunt connection therein for the solenoid, and a manually operated switch controlling both of said circuits and including the shunts, whereby the motor may be reversed but the solenoid may be connected always to the same side of the battery.

4. The combination in an industrial truck, of a load elevating and lowering platform, mechanism for actuating the platform, a reversible motor driving said mechanism, a battery, a circuit between the battery and the motor, a switch controlling said circuit, means connecting said actuating mechanism and the switch for automatically opening the switch to thereby stop the motor when the load stress is unexpectedly released from the platform actuating mechanism, a second circuit connecting the motor and battery electrically reverse relative to the first named circuit and switch means operable independently of said connecting means for closing said last named circuit to reverse the motor.

5. In an industrial truck of the character described, the combination of a load elevating and lowering platform, a mechanism for actuating the platform including a winding drum and a cable connecting the drum with the platform, a reversible motor driving said drum, a battery, a circuit connecting the battery to the motor, to cause the motor to be driven in a direction to drive the drum in a cable unwinding direction, a switch in said circuit and means responsive to a slack condition of the cable for actuating said switch to disconnect the motor from the battery, a second circuit connecting the motor and battery whereby the motor drives the cable drum in an opposite direction and a switch controlling both circuits whereby only one circuit may be closed at a given time regardless of the actuation of the first named switch by the taut condition of the cable.

In testimony whereof, I hereunto affix my signature.

CLYDE E. COCHRAN.